United States Patent [19]
Johanndeiter et al.

[11] Patent Number: 4,739,395
[45] Date of Patent: Apr. 19, 1988

[54] CIRCUIT ARRANGEMENT FOR INCREASING THE DEFINITION OF COLOR CONTOURS OF A COLOR TELEVISION SIGNAL USING SELECTIVE EDGE ENHANCEMENT

[75] Inventors: Martin H. Johanndeiter, Hamburg; Jürgen Ruprecht, Oststeinbek; Detlef W. K. Oldach, Hamburg; Martin Schmidt, Kiel, all of Fed. Rep. of Germany

[73] Assignee: U.S. Philips Corporation, New York, N.Y.

[21] Appl. No.: 932,953

[22] Filed: Nov. 19, 1986

[30] Foreign Application Priority Data

Nov. 21, 1985 [DE] Fed. Rep. of Germany ....... 3541103

[51] Int. Cl.⁴ ............................................. H04N 9/64
[52] U.S. Cl. .................................................... 358/37
[58] Field of Search ................................. 358/37, 166

[56] References Cited

U.S. PATENT DOCUMENTS 3,778,543 12/1973 Lowry ................................. 358/37

FOREIGN PATENT DOCUMENTS 1562170 8/1970 Fed. Rep. of Germany .
140825 11/1979 Japan ..................................... 358/37

Primary Examiner—John W. Shepperd
Attorney, Agent, or Firm—Algy Tamoshunas; Gregory P. Gadson

[57] ABSTRACT

The invention relates to a circuit arrangement for increasing the resolution of color contours. A slope detector detects the slope of the luminance signal and, when a predetermined slope value is exceeded, produces a detection signal for energizing a counter. The counter controls an edge enhancement circuit for a color difference signal, in which, as soon as the counter is energizing, the value of the color difference signal is stored and is available as an output signal. After a predetermined number of equidistant clock pulses has been counted, the edge enhancement circuit (7, 16) supplies the actual color difference signal value. If before the end of the counting operation, a new detection signal is produced, then the edge enhancement circuit briefly receives and stores the actual color difference signal value, and the counter starts a new counting cycle.

6 Claims, 2 Drawing Sheets

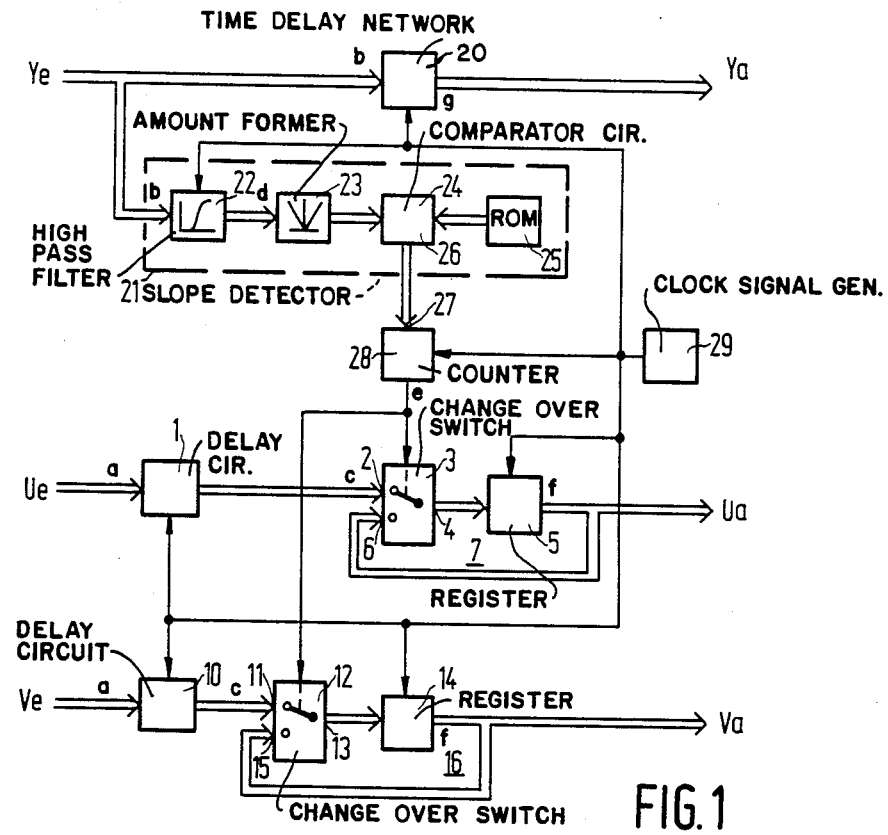
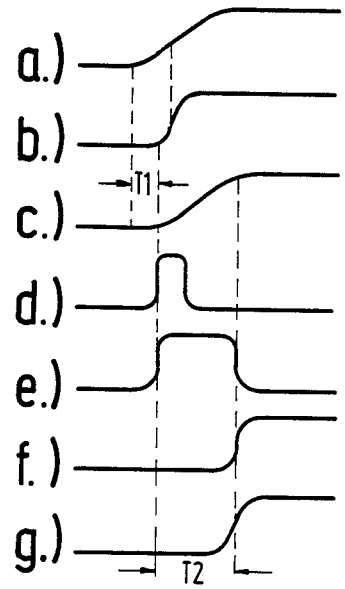
FIG.1
FIG.2

CIRCUIT ARRANGEMENT FOR INCREASING THE DEFINITION OF COLOR CONTOURS OF A COLOR TELEVISION SIGNAL USING SELECTIVE EDGE ENHANCEMENT

BACKGROUND OF THE INVENTION

The invention relates to a circuit arrangement for increasing the definition of color contours during the display of a color television signal formed from a luminance signal and at least one color difference signal, comprising a slope detector which detects the slope of the luminance signals and produces a detection signal when the slope exceeds a predetermined value, a control circuit controlling at least one color difference signal edge enhancement circuit formed by a change-over switch and a store, and a delay circuit for the luminance signal for providing coincidence with the edge enhanced color difference signal.

The picture resolution in contemporary television transmission systems is limited by the prescribed transmission bandwidth. The color difference signals are transmitted with a bandwidth which amounts to only approximately one fifth of the bandwidth of the luminance signal. The color resolution in the television picture is correspondingly low. This is more specifically noticeable at contours. The color transitions are even approximately five times longer than the associated luminance transitions corresponding to the smaller transmission bandwidth of the color difference signals.

In order to improve the resolution of the contours, it is therefore necessary to increase the comparatively flat color signal slope at the edges. Such a circuit arrangement of the type defined in the opening paragraph to increase the resolution at color contours is disclosed in German Auslegeschrift No. 1562170. In the circuit disclosed in said Auslegeschrift, the luminance signal is applied to a slope detector which produces a detection signal when the slope in the luminance signal is steep enough. The two color difference signals are applied to the change-over switch via a delay circuit which has a time delay approximately equal to half the time of the maximum slope (half the rise time) of a color difference signal. The output of the slope detector is connected to a first pulse shaper which, at the occurrence of the detection signal, briefly closes a first switch, so that the output of the delay circuit is connected to the input of the store. Also, a control circuit is energized, which switches the change-over switch such that the output of the store constitutes the output of the change-over switch. After half a rise time, a second pulse shaper briefly closes a second switch which connects the input of the delay circuit to the input of the store. After a further half rise time, the control switch resets the change-over switch.

Since the luminance signal has a significantly larger bandwidth than a color difference signal, it may happen that during a long rise time of a color difference signal a plurality of sudden transients occur in the luminance signal. Although an edge enhancement of a color difference signal is unwanted then, the slope detector supplies a detection signal for producing a color difference signal with a steeper slope. In addition, a switch of the control circuit arranged between the first pulse shaper and the slope detector is opened when a detection signal has occured, and is closed again after the edge enhanced color difference signal has been generated. This circuit configuration produces color purity errors in the television picture.

German Offenlegungsschrift No. 32 23 580 also discloses a circuit arrangement for increasing the resolution of color contours, in which a color difference signal is entered into a store via a switch and is also applied to a slope detector which produces a detection signal when the slope exceeds a predefined value. At the occurrence of the detection signal the switch is opened, and after the rise time of the color difference signal has ended, the switch is closed again. The store consequently supplies the edge enhanced color difference signal. The attendant delay in the color difference signal is compensated for by a corresponding delay in the luminance signal.

In the commonly used video recorder systems the bands of the luminance and color difference signals are additionally limited during recording. This causes the rise time of the color difference signal to be prolonged on display. In practice it has been found that a circuit arrangement such as it is described in DE-OS No. 32 23 580 does not always detect the vertical color contours in the same position in a line, so that color contour distortions occur in the picture.

SUMMARY OF THE INVENTION

The invention has for its object to structure a circuit arrangement of the type defined in the opening paragraph such that when a plurality of sudden transients occur in the luminance signal during the rise time of a color difference signal, no color purity errors occur.

According to the invention, this object is accomplished in that when the change-over switch is in the first position, a color difference signal is stored in the store which supplies the edge enhanced color difference signal, and in the second position no color difference signal is applied, and that the control circuit includes a counter which at the occurrence of the detection signal sets the change-over switch from the first to the second position and after a number of counted, equidistant clock pulses corresponding to at least the duration of the steepest slope of the color difference signal resets the change-over switch to the first position, and which at the occurrence of a new detection signal during the second position of the change-over switch resets ir briefly to the first position and then, after setting to the second position, again counts the corresponding number of clock pulses. In the circuit arrangement according to the invention, increasing the slope of the color difference signal is effected in a simple manner always with the aid of a change-over switch and a store, in which at the beginning of a rising slope, the value of the color difference signal is stored, and to which after the end of the slope, the new value is transferred. The duration of the storage is determined by a counter, which after the occurrence of a detection signal, counts a predetermined number of regularly occurring clock pulses. The number of clock pulses must correspond to at least the shortest rise time of a color difference signal. The new value of the color difference signal is then taken over after the end of the slope. When at a slower change in the color difference signal a plurality of sudden transients occur in the luminance signal, no color purity errors are produced in the color difference signal as in the prior art circuit arrangement. The sudden transients in the luminance signal always produce a detection signal which triggers the counter at the beginning of the transients or, when the counter is already counting, resets it to its initial position where it starts counting again. During the occurrence of the detection signal the change-over switch is briefly adjusted to the first position, so that the store can store a new value. As a result thereof the continuous color difference signal changes into a step signal, which however does not produce any noticeable errors in the television picture.

In a further development of the invention it is provided that the slope detector comprises a high-pass filter differentiating the luminance signal, an amount former focussing the value of the differentiated luminance signal and a comparator circuit which compares the output signal of the amount former to a reference signal and supplies the detection signal when the output signal of the amount former exceeds the reference signal.

As when a sufficiently large slope of the luminance signal is detected, the value of the color difference signal must be stored at the beginning of a rising slope, it is provided that the color difference signal is applied to the peaking circuit via a delay circuit, so that the beginning of a rise in the color difference signal and in the luminance signal coincide. In a further embodiment of the invention, it is provided that the luminance signal and the color difference signal are present as a sequence of amplitude-discrete sampling values with a sampling frequency determined by a clock signal, and that the sampling frequency is equal to the frequency of the clock signal applied to the counter. In a digital implementation of the circuit arrangement, the clock generator required to the counters and generating the clock signal can also be used for the other components.

In the digital circuit arrangement there is a simple possibility of realizing the store, because a register is used whose input is connected, in the second position of the change-over switch, to its output.

BRIEF DESCRIPTION OF THE DRAWINGS

The invention will now be described in greater detail by way of example with reference to the accompanying drawings, in which FIG. 1 shows an embodiment of the invention, FIG. 2 shows diagrams to explain FIG. 1.

DETAILED DESCRIPTION OF THE INVENTION

Figure 3:
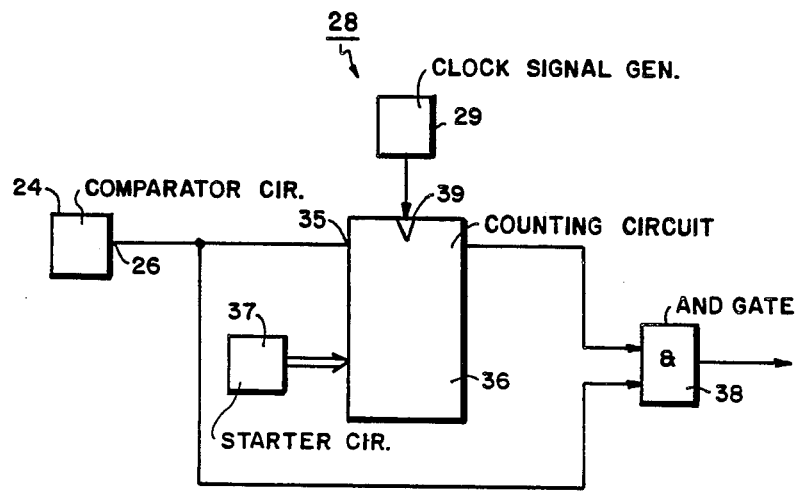
FIG. 3 shows a counter for use in the embodiment shown in FIG. 1.

In FIG. 1, V and U are color difference signals, and Y is the luminance signal. The input signals are denoted by the index e and the output signal by the index a. The luminance signal and the color difference signals are available as sequences of binary encoded sampling values and have, for example, a resolution of 7 bits. The sampling variations occur at a repetition rate, the sampling frequency, of for example 13.5 MHz.

The color difference signal Ue is applied to an input 2 of a change-over switch 3 via a delay circuit 1 producing a time delay of T1. The output 4 of the change-over switch 3 is connected to a register 5, which supplies the color difference signal Ua, and whose output is connected to the second input 6 of the change-over switch 3. The change-over switch 3 and the register 5 form a first edge enhancement circuit 7. The second color difference signal Ve is applied to a delay circuit 10, which also produces a time delay T1. The output of the delay circuit 10 is connected to the first input 12 of a change-over switch 12. The output 13 of the change-over switch 12 is connected to a register 14 whose output is connected to the second input 15 of the change-over switch 12 and also supplies the color difference signal Va. The change-over switch 12 and the register 14 form a second edge enhancement circuit 16. The luminance signal Ye is applied to a time delay network 20, producing a time delay T2, and supplying the luminance signal Ya, and also to a slope detector 21, which comprises a high-pass filter 22, an amount former 23, a comparator circuit 24 and a read-only memory 25. The luminance signal Ye is differentiated in the high-pass filter 22, the amount of the differentiation is formed in the amount former 23, and the output signal of the amount former 23 is compared in the comparator circuit 24, which produces a detection signal, to a value stored in the read-only memory 25. The output 26 of the slope detector 21, which also constitutes the output of the comparator circuit 24 is connected to the input 27 of a counter 28. A clock signal from a clock signal generator 29 whose frequency is equal to the sampling frequency is applied to the counter 28. Similarly, the clock signal is applied to the delay circuit 1,10 and 20, to the registers 5 and 14 and the high-pass filter 22.

The counter 28 is triggered by a detection signal applied to it by the comparator circuit 24. The comparator circuit 24 supplies a detection signal as soon as the output signal of the amount former 23 exceeds the value stored in the read-only memory 25. The counter 28 is started by the detectionsignal, and simultaneously the change-over switches 3 and 12 then switch from a first to a second position. In the first position the output of the change-over switch 3 is connected to its input 2 and in the second position to its input 6. When the change-over switch 12 is in the first position its outpuut 13 is connected to the input 11, and during the second position to its input 15. After the counter 28 has counted a predetermined number of clock signals it supplies a control signal which is applied to the two change-over switches 3 and 12, causing the change-over switches 3 and 12 to switch back to their first position.

Now the mode of operation of the circuit arrangement of FIG. 1 will be described in detail with reference to the time schedule of FIG. 2. Diagram a shows a color difference signal and diagram b a luminance signal. The ascend from a lower to a higher level takes more time for the color difference signal than for the luminance signal because of the small bandwidth of the color difference signal compared with the luminance signal. The luminance signal is differentiated in the high-pass filter 22, so that a pulse is applied to the input of the amount former 23 when an increase in luminance is present, as shown schematically in diagram d. When the signal at the output of the amount former 23 exceed the value stored in the read-only memory 25, a detection signal is produced which triggers the counter 28. In this situation the stored value corresponds to the amount of the slope at which the color difference signal is approximately steepest. Simultaneously, the counter 28 produces a control signal which switches the change-over switches 3 and 12 to their second position. After a predetermined number of counted clock pulses the counter is reset, and the control signal changes such that the change-over switches 3 and 12 return to their first positions. The control signal of the counter 28 is shown schematically in diagram e.

As the color difference signal has a narrower bandwidth than the luminance signal, the ascend of the color difference signal starts earlier at a color contour than the ascend of the luminance signal. The centers of the ascends of the two signals coincide, as can be seen from the diagrams a and b. To ensure that the starts of the ascends of the color difference signal and the luminance signal coincide, the color difference signal is delayed by a time T1. Diagram c shows the delayed color difference signal. At the occurrence of a detection signal, the change-over switches 3 and 12 are adjusted from the first to the second position, and consequently the color difference signal value available before the ascend is stored in the stores 5 and 14. When the counter 28 has counted the predetermined number of clocks based on the period of time elapsed after the ascend in the color difference signal, the change-over switches 3 and 12 are reset to their first position, and the actual color difference signal value is supplied via the respective stores 5 and 14. Diagram f represents the edge enhanced color difference signal Ua or Va appearing at the output of the stores 5 and 14.

In order to recover the coincidence between the luminance signal and the edge enhanced color difference signal, the luminance signal is delayed in the delay circuit 20 by a time delay T2. The luminance signal Ya appearing at the output of the delay circuit 20 is shown in diagram g.

When the comparator circuit 24 produces a detection signal, when the counter 28 is counting and the change-over switches 3 and 12 are in their second positions, the counter is reset and consequently the change-over switches 3 and 12 are reset to their first position. At the subsequent clock pulse the counter 28 starts counting again and simultaneously switches the change-over switches 3 and 12 to the second positions again. Because of this feature, providing the possibility to restart the counter again, no color frequency errors occur in the picture when a luminance signal having a plurality of sudden signal transients occurs, but the color difference signal changes only slowly. At the outputs of the two peaking circuits 7 and 16 a stepped signal then appears which does not cause any noticeable color periodicy errors.

FIG. 3 shows a practical example of the counter 28. The output 26 of the comparator circuit 24, which produces the detection signal is connected to a start input 35 of a counting circuit 36 and also to a first input of an AND-gate 38. In addition, a starter circuit 37 is present, in which the counting position is stored from which the counting circuit 36 starts counting. The output of the counting circuit 36 is connected to a further input of the AND-gate 38. The output signal of the AND-gate 38 is the control signal of the counter 28. The counting circuit 36 has a further clock input 39 to which the clock signal generated by the clock signal generator 29 is applied.

If the output signal of the amount former 23 exceeds the signal supplied by the read-only memory 25, then the detection signal of the comparator circuit 24 changes such that it varies from a high to a low level. At the clock pulse subsequent to this level change the counting position of the store 37 is loaded into the counting circuit 36. Simultaneously, the output signal of the counting circuit 36 changes from a low level to a high level. The output signal of the counting ciruit 36 remains at a high level until the counting circuit 36 has counted to zero, starting from the counting position loaded therein. As the detection signal remains at a low level during a few clock signals only, the control signal of the counter 28, that is to say the output signal of the AND-gate 38 is changed after the clock signal change to a high level. The output signal of the AND-gate 38 changes from a low to a high level. When the counting circuit 36 has counted to zero, its output signal changes to a low level, as does also the control signal. If the state of the detection signal changes before the counting circuit 36 has counted to zero, the control signal is briefly adjusted to a low level, as the detection signal changes from a high to a low level. The output signal of the counting circuit remains at a high level.

If a sudden transient occurs in the luminance signal, while a color difference signal does not have such a transient, the change-over switches 3 and 12 are adjsuted from the first position to the second position. As, however, the color difference signal changes only little, it is hardly affected by this sudden transient in the luminance signal. If however a sudden transient occurs only in the color difference signal, then the color difference signals are transmitted without any change, that is to say with the duration of the ascend determined by the bandwidth limitation.

What is claimed is:

1. A circuit arrangement for increasing the definition of color contours during the display of a color television signal formed from a luminance signal and at least one color difference signal, comprising a slope detector which detects the slope of the luminance signal and produces a detection signal when the slope exceeds a predetermined value, a control circuit controlling at least one color difference signal edge enhancement circuit formed by a change-over switch and a store, and a delay circuit for the luminance signal for providing coincidence with the edge enhanced color difference signal, whereby when the change-over switch is in the first position a color difference signal is stored in the store which supplies the edge enhanced color difference signal and in the second position no color difference signal is applied and that the control circuit includes a counter which at the occurrence of the detection signal sets the change-over switch from the first to the second position, and after a number of counted equidistant clock pulses corresponding to at least the duration of the steepest slope of the color difference signal resets the change-over switch to the first position and which at the occurrence of a new detection signal during the second position of the change-over switch resets it briefly to the first position and then, after setting to the second position again counts the corresponding number of clock pulses.

2. A circuit arrangement as claimed in claim 1, wherein the slope detector comprises a high-pass filter which differentiates the luminance signal, an amount former for forming the amount of the differentiated luminance signal, and a comparator circuit comparing the output signal of the amount former to a reference signal and supplying the detection signal when the output signal of the amount former exceeds the reference signal.

3. A circuit arrangement as claimed in claim 1 the color difference signal is applied to the edge enhancement circuit via a delay circuit, so that the starts of an ascend in the color difference and luminance signals coincide.

4. A circuit arrangement as claimed in claims 1-3 wherein the luminance signal and the color difference signal are available as a sequence of amplitude-discrete sampling value having a sampling frequency determined by a clock signal, and the sampling frequency is equal to the frequency of the clock signal applied to the counter.

5. A circuit arrangement as claimed in claim 4, wherein the store is a register whose input is coupled, to its output when the change-over switch is in the second position.

6. A circuit arrangement as claimed in claim 2, wherein the color difference signal is applied to the edge enhancement circuit via a delay circuit, so that the starts of an ascend in the color difference and luminance signals coincide.

* * * * *

UNITED STATES PATENT AND TRADEMARK OFFICE
CERTIFICATE OF CORRECTION

PATENT NO.   : 4,739,395
DATED        : April 19, 1988
INVENTOR(S)  : Martin H. Johanndeiter et al It is certified that error appears in the above-identified patent and that said Letters Patent is hereby corrected as shown below:

Claim 3, line 1   after "claim 1" insert --wherein--

Signed and Sealed this

Twenty-eighth Day of February, 1989

Attest:

DONALD J. QUIGG

*Attesting Officer*           *Commissioner of Patents and Trademarks*